J. W. WARD.
PRESS FOR ATTACHING COMB FOUNDATIONS TO HONEY FRAMES FOR BEEHIVES.
APPLICATION FILED JUNE 16, 1910.

985,236.

Patented Feb. 28, 1911.

2 SHEETS—SHEET 1.

Witnesses
Stuart Hilder.
Frances M. Anderson.

Inventor
J. W. Ward
by
E. W. Anderson & Son
his Attorneys

J. W. WARD.
PRESS FOR ATTACHING COMB FOUNDATIONS TO HONEY FRAMES FOR BEEHIVES.
APPLICATION FILED JUNE 16, 1910.

985,236.

Patented Feb. 28, 1911.

2 SHEETS—SHEET 2.

Witnesses
Stuart Hilder.
Frances M. Anderson.

Inventor
J. W. Ward,
by E. W. Anderson Hon.
his Attorneys

UNITED STATES PATENT OFFICE.

JEFFERSON W. WARD, OF UVALDE, TEXAS.

PRESS FOR ATTACHING COMB FOUNDATIONS TO HONEY-FRAMES FOR BEEHIVES.

985,236.  Specification of Letters Patent.  Patented Feb. 28, 1911.

Application filed June 16, 1910. Serial No. 567,324.

*To all whom it may concern:*

Be it known that I, JEFFERSON W. WARD, a citizen of the United States, resident of Uvalde, in the county of Uvalde and State of Texas, have made a certain new and useful Invention in Presses for Attaching Comb Foundations to Honey-Frames for Beehives; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
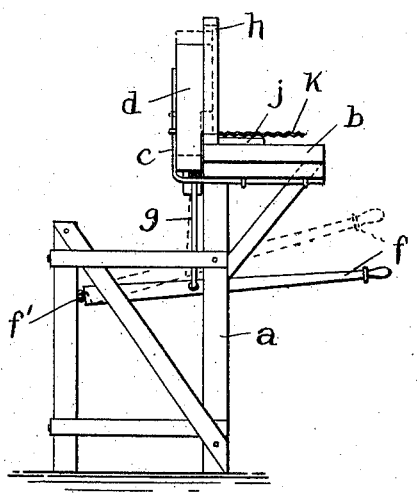
Figure 3:
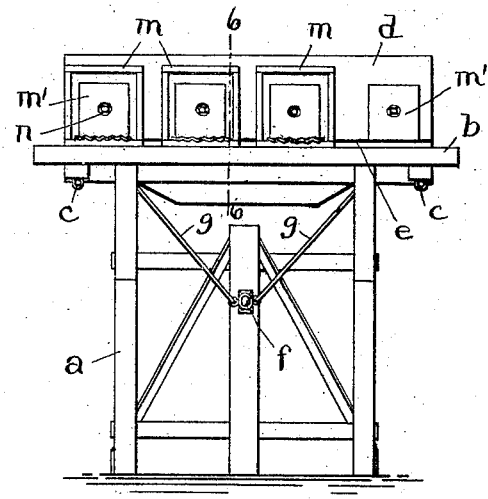
Figure 4:
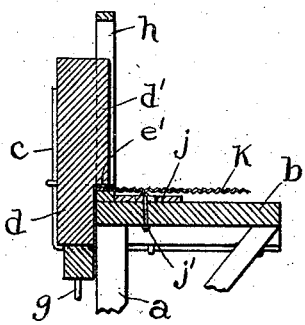
Figure 2:
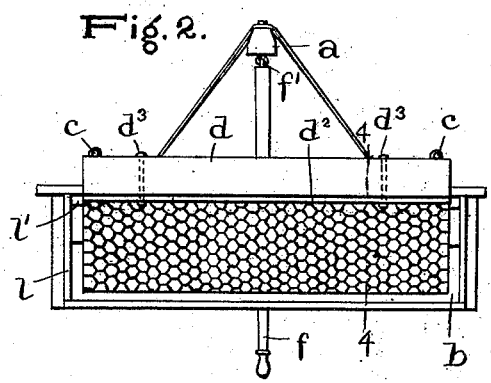
Figure 6:
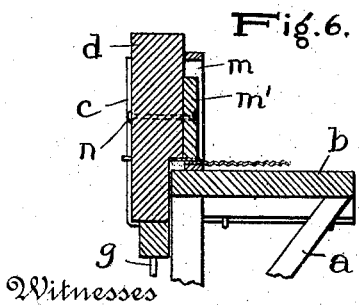
Figure 5:
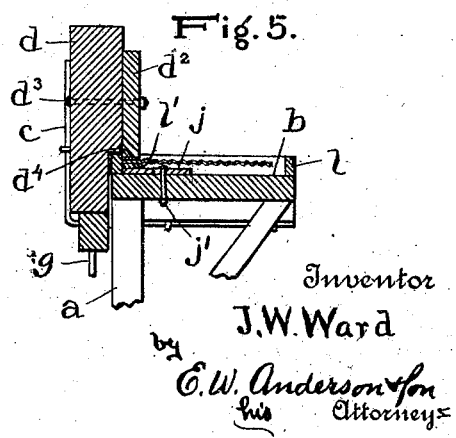
Figure 7:
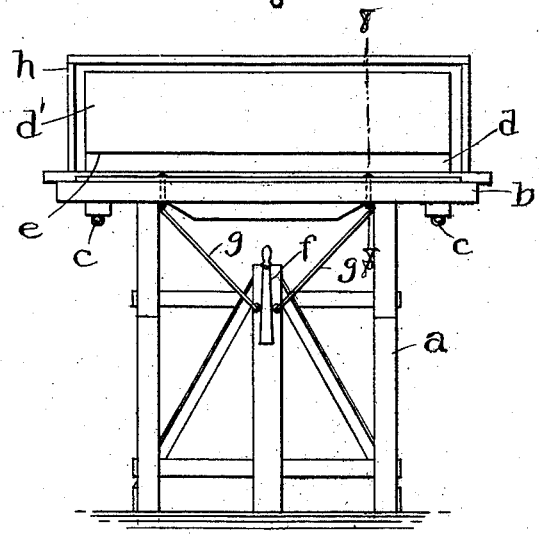
Figure 8:
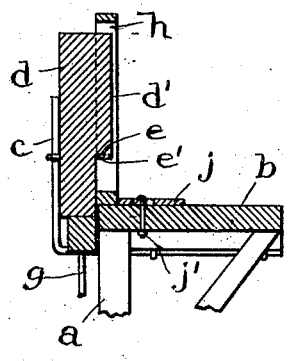

Figure 1 is an end view of the press with the raised position of parts shown in dotted lines, and showing the honey frame and comb foundation in place. Fig. 2 is a plan view of the press with the honey frame and comb foundation. Fig. 3 is a front view of the same, showing the small one pound honey frames in place. Fig. 4 is a section on the line 4—4 Fig. 2, parts being shown as broken away. Fig. 5 is a similar view with a different form of honey frame in place. Fig. 6 is a section on the line 6—6 Fig. 3. Fig. 7 is a front view of the press with a large honey frame in place and the press block raised. Fig. 8 is a section on the line 8—8 Fig. 7.

The invention has relation to a press for attaching wax comb foundations to honey frames for use in bee hives, and it consists in the novel construction and combinations of parts as hereinafter set forth.

In the accompanying drawings illustrating the invention, the letter $a$ designates a supporting frame, having a raised table or platform $b$, constituting a support for the work. Working upon guide rods $c$, $c$, of said frame is a vertically reciprocatory press member $d$, having a forward offset front portion $d'$, provided with a lower horizontal face $e$, overlying the rear edge portion of the table, this press member being actuated by means of an operating lever $f$, fulcrumed at one end thereof to the frame at $f'$, and having a branched connecting rod $g$ with opposite end portions of the press member.

In the application of the invention to a honey frame $h$ of large character, this frame is placed upright or on edge longitudinally at the rear portion of the table, with its front edge against a longitudinal bearing piece $j$, detachably secured to the table by means of screws or bolts $j'$, and the offset portion $d'$ of the press member within the honey frame. The wax comb foundation sheet $k$ being then placed horizontally with its rear edge portion in the interval between the lower strip of the honey frame and the lower or press face $e$, of the press member, and the lever actuated, the wax sheet will be pressed against the honey frame strip and caused to adhere thereto, the press face $e$ having a covering of canvas $e'$ which is kept moist or wet to prevent adherence of the wax sheet thereto. The operating lever is now actuated reversely, and the honey frame removed from the press, after which the body or main portion of the comb foundation sheet is bent parallel to and within the honey frame, as shown, when this frame is ready to be placed in the hive.

In the application of the invention to a honey frame $l$ also of large character, and having a comb guide strip $l'$, forming an inner reduced extension of one side of the frame, this frame $l$ is placed horizontally upon the table with its rear edge against the longitudinal bearing piece $j$, which in this case is adjusted slightly to the rear (the sides of the honey frame being less thick than they are wide) the comb guide strip resting upon the top of said bearing piece. The press member $d$ has a press block $d^2$, detachably secured to its forward face by means of screws or bolts $d^3$, said press block having a lower horizontal or press face $d^4$, overlying the comb guide strip in vertical alinement therewith. The wax comb foundation sheet being now placed horizontally with its rear edge portion in the interval between the press face $d^4$ and the comb guide strip, and the press member actuated by the lever, the wax sheet will be pressed against the comb guide strip and cause to adhere thereto, a moistened canvas covering being provided for the press face as previously stated.

When my press is used with small one pound honey frames $m$, $m$, small press blocks $m'$, $m'$, are detachably secured to the forward face of the press member $d$, by means of screws or bolts $n$, $n$, and the small honey frames placed upright upon the table with the small press blocks within the frames, the longitudinal bearing piece being in this case removed from the table entirely, although it may be adjusted to proper position to form a forward bearing for the honey frames if desired. The wax comb foundation sheets of the proper size being now adjusted horizontally to position with their rear edge portions between the lower or press faces of the small press blocks and the lower sides of the honey frames, and the operating lever actuated, the wax sheets will be secured in position at one edge portion thereof, when the honey frames are removed from the press, and the main portions of the wax sheets bent parallel to and within the honey frames ready for use in the hive.

In the operation of the invention, the press member $d$ may be held in raised position by any suitable means, and when in use caused to be gradually lowered by means of the operating lever until it rests upon the work. The lever is then operated to cause a tension of the press member against the work to cause the comb foundation sheet to adhere thereto, although the weight of the press member alone may be sufficient for this purpose.

Having thus described my invention, what I claim as new and desire to secure by Letters Patent is:

1. In a press for attaching wax comb foundation sheets to honey frames for bee hives, a supporting frame having a table, a vertically reciprocatory press member having a projection capable of fitting within the aperture of a vertically arranged honey frame and having a narrow horizontal plane surface press face operating over said table, and means for actuating said press member.

2. In a press for attaching wax comb foundation sheets to honey frames for bee hives, a supporting frame having a table, lateral guides, a vertically reciprocatory press member working in said guides and having a press block attachment both said press member and said attachment being each capable of fitting within honey frames of different styles and having each a narrow horizontal plane surface press face operating over said table, and means for actuating side press member.

3. In a press for attaching wax comb foundation sheets to honey frames for bee hives, a supporting frame having a table, a vertically reciprocatory press member having a press block attachment, both said press member and said attachment being each capable of fitting within honey frames of different styles and provided each with a narrow press face operating over said table, a longitudinal bearing strip upon said table, and means for actuating said press member.

4. In a press for attaching wax comb foundation sheets to honey frames for bee hives, a supporting frame having a table, a vertically reciprocatory gravity operating press member having a lateral projection capable of fitting within the aperture of a vertically arranged honey frame and provided with a narrow press face operating over the table, and a lever device for positively actuating said press member.

In testimony whereof I affix my signature, in presence of two witnesses.

JEFFERSON W. WARD.

Witnesses:
ZENA DALRYMPLE,
F. R. WILLIAMS.

---

Copies of this patent may be obtained for five cents each, by addressing the "Commissioner of Patents, Washington, D. C."